United States Patent

[11] 3,588,678

[72] Inventor Richard R. Ernst
Winterthur, Switzerland

[21] Appl. No. 868,430
[22] Filed Oct. 22, 1969
Division of Ser. No. 568,041, July 26, 1966, abandoned.
[45] Patented June 28, 1971
[73] Assignee Vauan Associates
Palo Alto, Calif.

[54] SPECTROMETERS USING AN R.F. NOISE GENERATOR EMPLOYING A CARRIER MODULATED BY A BINARY RANDOM SEQUENCE
9 Claims, 9 Drawing Figs.

[52] U.S. Cl. .... 324/0.5, 250/41.9
[51] Int. Cl. .... G01n 27/78
[50] Field of Search .... 324/0.5; 250/41.9; 235/151.35; 331/78

[56] References Cited

UNITED STATES PATENTS 3,287,629 11/1966 Varian .... 324/0.5

OTHER REFERENCES

R. R. Ernst and H. Primas - Nuclear Magnetic Resonance with Stochastic High-Frequency Fields-Helvetica Physica Acta - 36(5) - 1963 - pp. 583—600.

IBM Technical Disclosure Bulletin - 8(9) - Feb. 1966 - p. 1232.

*Primary Examiner*—Michael J. Lynch
*Attorneys*—Stanley Z. Cole and Vincent W. Cleary

ABSTRACT: Radiofrequency spectrometer systems employing a radiofrequency noise generator are disclosed. The noise generator includes a radiofrequency generator for generating a radiofrequency carrier signal. A binary data output generator generates a binary random sequence signal. The output of the binary random sequence generator is employed for phase modulating the radiofrequency carrier signal by plus or minus 180° relative phase at the binary random sequence, whereby the power of the noise output signal of the modulator remains essentially constant with time while producing a broadband high spectral density noise output having a well defined, continuous function power spectrum.

Figure 1:
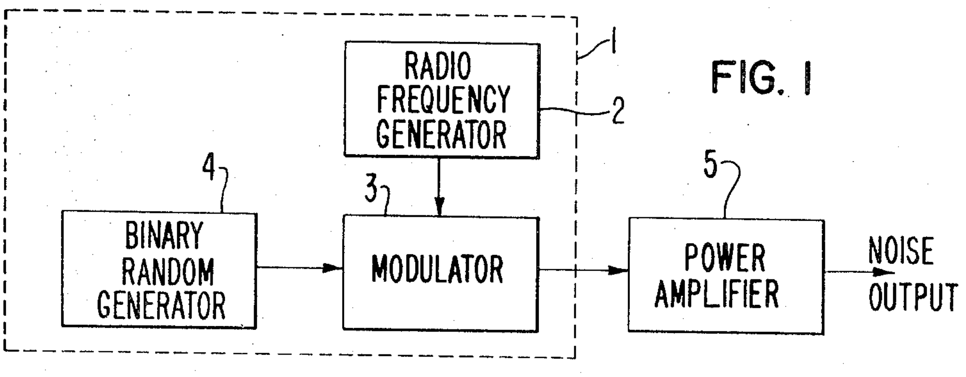

INVENTOR
RICHARD R. ERNST

ATTORNEY

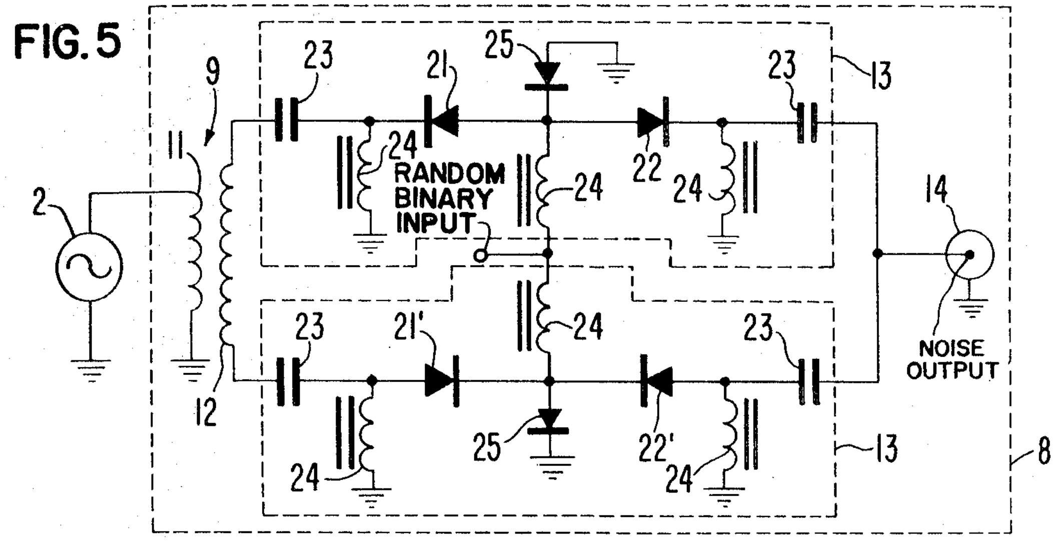
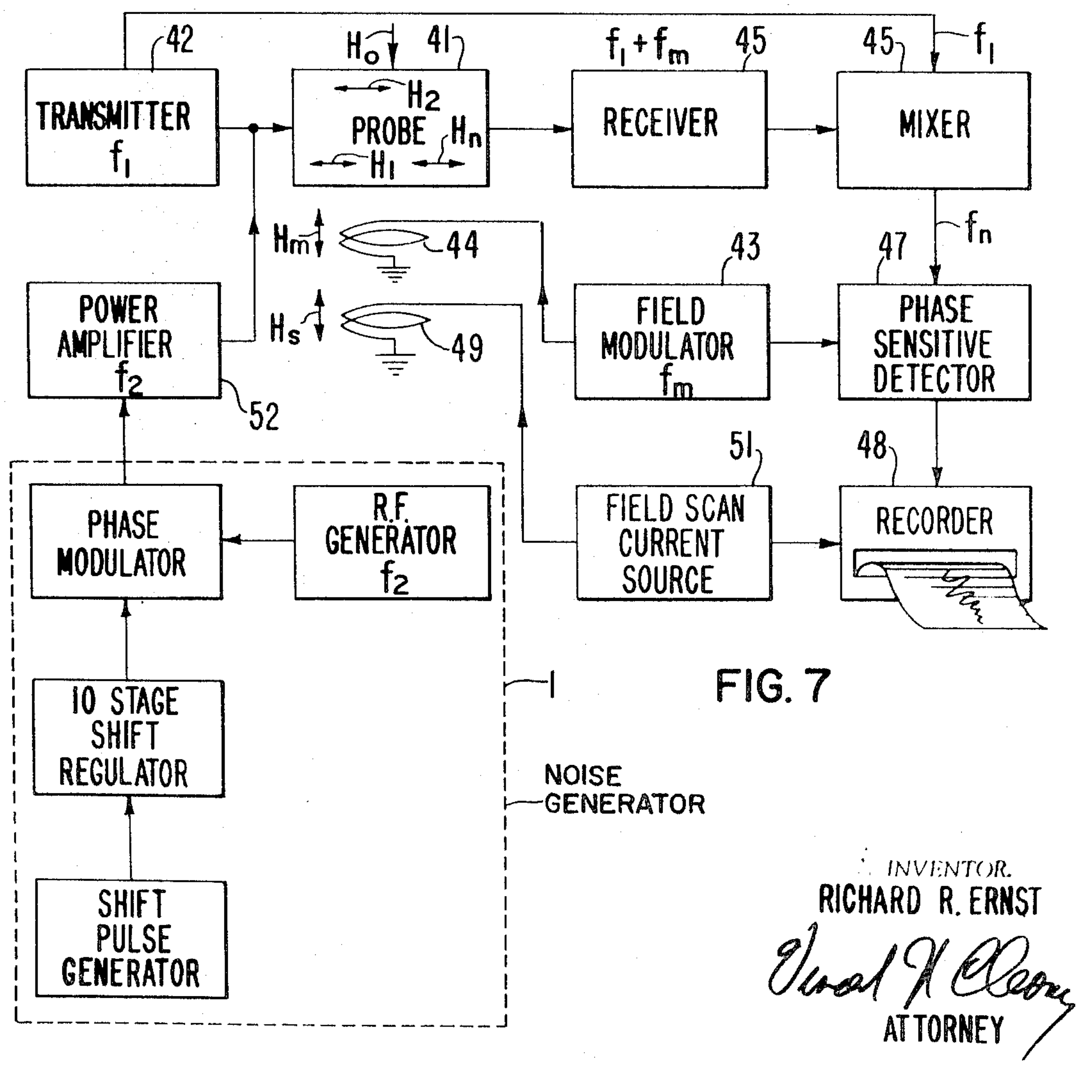
INVENTOR.
RICHARD R. ERNST
ATTORNEY

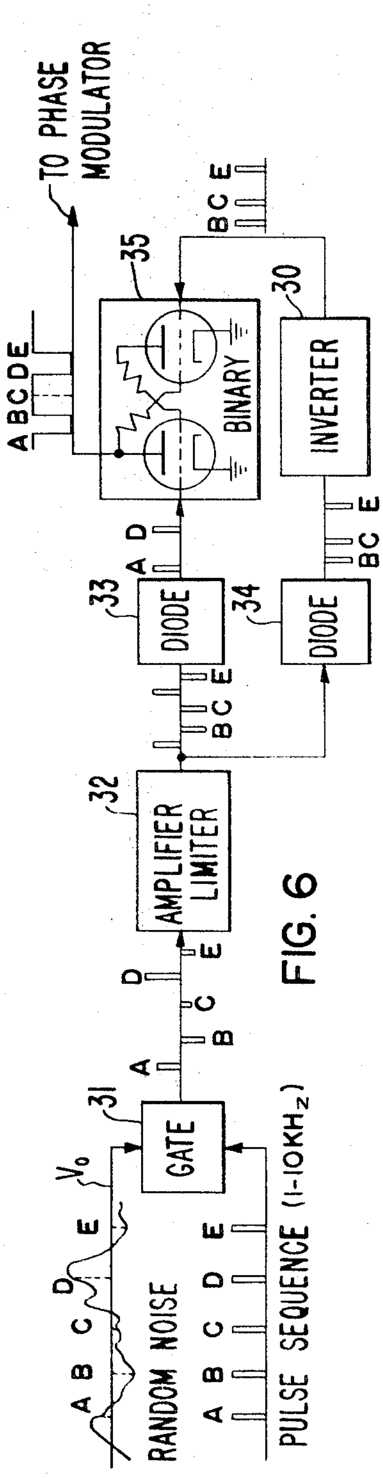
FIG. 6
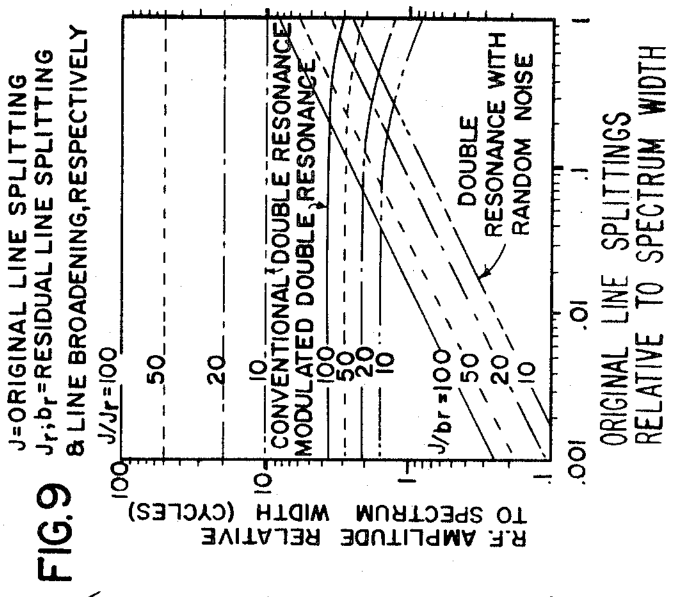
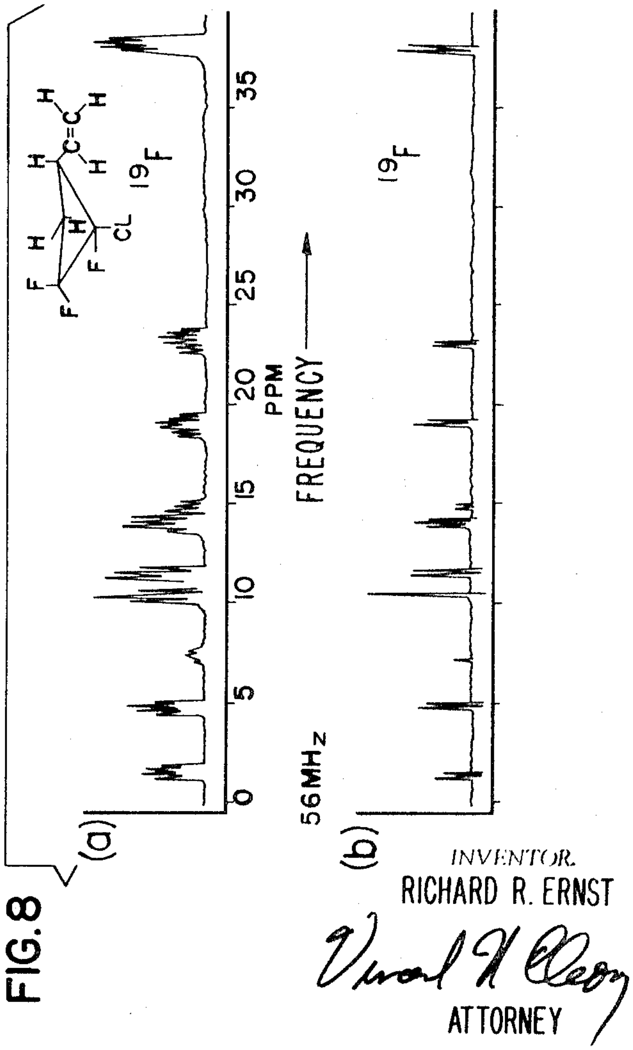
FIG. 8
INVENTOR.
RICHARD R. ERNST
ATTORNEY

SPECTROMETERS USING AN R.F. NOISE GENERATOR EMPLOYING A CARRIER MODULATED BY A BINARY RANDOM SEQUENCE

This is a division of application Ser. No. 568,041 filed July 26, 1966 now abandoned.

Heretofore, it has been proposed to obtain broadband decoupling of magnetic spin systems by application of broadband noise, i.e., an incoherent source of radio frequency wave energy which has sufficient bandwidth and spectral power density to produce incoherent resonance of one or the other of the individual spectra of two coupled spin systems. Such a system was proposed in an article entitled, "Nuclear Magnetic Resonance with Stochastic High Frequency Fields" by R. R. Ernst and H. Primas, and which appeared in Helvetica Physica Acta, Vol. 36, page 583 in 1963.

The problem with this prior proposal was the lack of a practical noise generator to provide a relatively wideband of noise power, i.e., on the order of a few kHz. at 60 MHz., with frequency components closely and evenly distributed, i.e., on the order of every fraction to a few Hz over the band of interest, and with substantial noise power, i.e., on the order of 1 to 10 watts into the transmitter coils.

In the present invention, a simple and practical wideband RF noise generator is provided by modulating an RF carrier with a binary random sequence. The binary modulation can be either in amplitude, in frequency or in phase. In a preferred embodiment, the binary modulation is in phase by shifting the phase in a random manner by 180° (a binary phase relation). This phase modulation is especially desirable since it does not produce mechanical vibration at high power levels as can be produced by amplitude modulation. It is superior to frequency modulation as the phase modulation is more easily accomplished with less complex electronics. This noise generator is especially useful in combination with a magnetic resonance spectrometer for broadband spin-spin decoupling of different kinds of nuclei in complex molecules.

The principal object of the present invention is the provision of an improved noise generator and spectrometer means using same.

One feature of the present invention is the provision of a noise generator wherein the noise is generated by modulating a carrier signal with a binary random sequence in amplitude, in frequency or in phase, whereby a broadband, high spectral density noise output is obtainable with a well defined continuous power spectral density function and whereby a simple low dynamic range output power amplifier may be employed for amplifying the noise.

Another feature of the present invention is the same as the preceding feature wherein the carrier signal is phase modulated by plus or minus 180°, whereby a simple gated phase modulator may be employed and whereby the power output of the noise generator is constant.

Another feature of the present invention is the same as any one or more of the preceding features wherein the binary random sequence is obtained from a shift register preferably connected for a maximum length sequence and driven by a train of coherent pulses obtained from a pulse generator, whereby a certain spectral power density of the noise bandwidth is obtained with a minimum of circuit components.

Another feature of the present invention is the same as any one or more of the preceding features including in combination a radiofrequency spectrometer with the aforesaid noise generator supplying noise power for irradiating the resonance spectrum of one species of nuclei, atoms, ions or molecules while observing the resonance spectrum of a different species of nuclei, atoms, ions or molecules coupled to said first species, whereby the detected resonance of one species is observed as affected by resonance of the other species.

Figure 4:
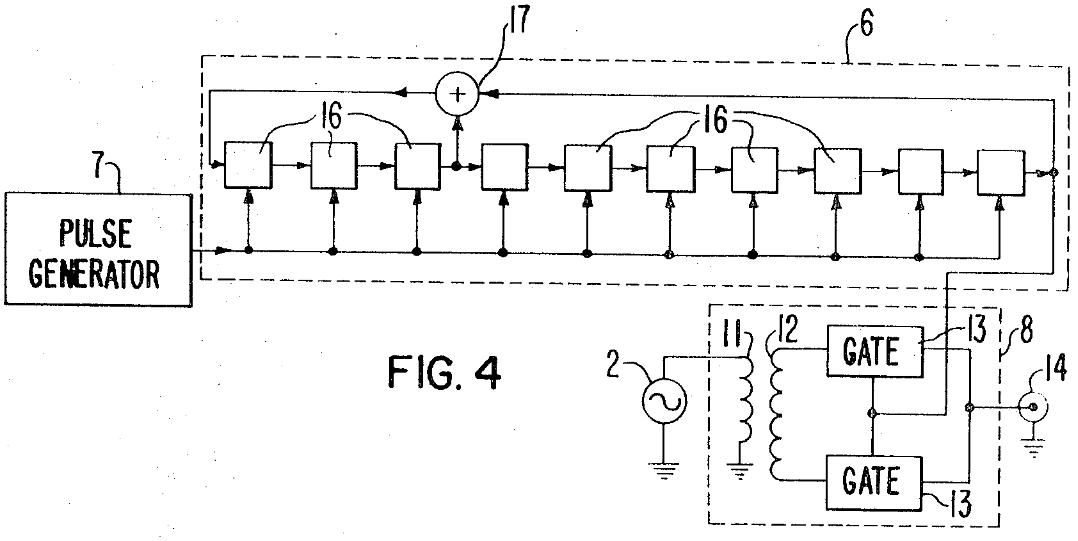
Figure 2:
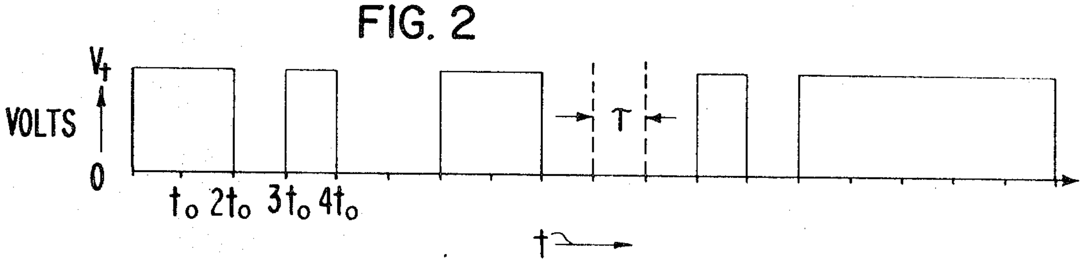
Figure 3:
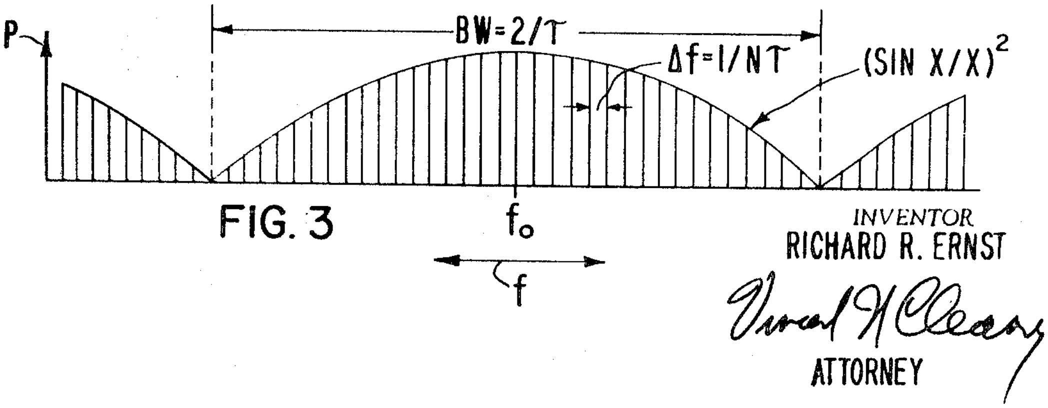

Other features and advantages of the present invention will become apparent upon a perusal of the following specification taken in connection with the accompanying drawings wherein:

FIG. 1 is a schematic block diagram of a noise generator of the present invention, FIG. 2 is a binary random sequence output signal, FIG. 3 is a power spectrum of the noise output signal obtained from the noise generator of FIG. 1, FIG. 4 is a schematic block diagram of a binary random generator and modulator incorporating features of the present invention, FIG. 5 is a circuit diagram of a phase modulator as employed in the circuit of FIG. 4, FIG. 6 is a schematic block diagram of an alternative binary random generator, FIG. 7 is a schematic block diagram of a gyromagnetic resonance spectrometer employing features of the present invention, FIGS. 8A and 8B are nuclear magnetic resonance spectra of $^{19}F$ nuclei of 1,1,2-Trifluoro-2-chloro-3-vinylcyclobutane, the (A) spectra being obtained without spin-spin decoupling and the (B) spectra being obtained with noise decoupling of the H nuclei, and FIG. 9 is a plot of relative RF decoupling field intensity versus frequency splittings relative to the spectrum width for various values of spin decoupling of a double resonance nuclear magnetic resonance spectrometer.

Referring now to FIG. 1 there is shown a noise generator 1 of the present invention. The noise generator 1 includes a radiofrequency (RF) generator 2 which supplies an RF carrier signal to a modulator 3 which modulates the carrier in frequency, in amplitude or in phase in accordance with a binary random sequence signal of the type shown in FIG. 2 which is obtained from a binary random signal generator 4. As used herein radio frequency (RF) means a frequency above 1 kHz. including audio, microwave and optical frequencies for acoustic and electromagnetic waves. The output of the modulator 3 is a noise signal with a power spectrum of the type shown in FIG. 3. The power spectrum has a well defined continuous function envelope characterized by a $(\sin x/x)^2$ function. The bandwidth of the spectrum between nodes is equal to $2/\tau$, where $\tau$ is the bit period, $t_0$, i.e., basic unit of the binary sequence as depicted in FIG. 2 The spectral line separation $\Delta f$ within the power envelope is equal to $1/N\tau$, where N is a number of binary bits in the binary sequence before the sequence repeats itself. In the case of a completely random binary sequence of infinite length, the frequency spacing of $\Delta f$ between adjacent fourier components of the noise would approach zero. On the other hand, if the sequence repeats and thus has a period of finite length as of, for example, 1023 bits, the sequence could be called a pseudorandom sequence (hereinafter included as a random sequence.) For a periodic sequence the frequency components of the power spectrum become discrete with frequency separation $\Delta f=1/N\tau$. To be useful as a noise generator of the present invention, N should be greater than 250.

A power amplifier 5 amplifies the noise to any suitable power level. Use of binary modulation greatly simplifies the power amplifier 5 since it need not have a wide dynamic range. For example, it can be operated in a region of nonlinear amplification.

Referring now to FIG. 4 there is shown a preferred noise generator embodiment of the present invention. In this embodiment, a shift register 6, which is connected to produce a maximum length sequence, more fully described below, is driven by a train of coherent pulses derived from a pulse generator 7. The output of the shift register 6 is a binary random sequence containing a certain number of bits before the sequence repeats. The number of bits in the sequence is $2^n-1$, where $n$ is the number of binaries in the shift register 6. The binary random sequence signal is applied to a phase modulator 8.

The phase modulator 8 modulates the phase of the RF carrier signal, as derived from the RF generator 2, by plus or minus 180° relative phase in accordance with the random binary input signal. The phase modulator 8 is more fully described below with regard to FIG. 5, but, briefly, includes an input transformer 9 the primary 11 of which is driven from the RF generator 2. The opposite ends of the secondary winding 12 have signals with opposite phase (shifted by 180°). A pair of gates 13 are connected between the opposite ends of the secondary winding 12 and an output terminal 14. The gates 13 are connected such that when a positive input signal is applied inbetween the gates 13 a first one of the gates 13 is opened and the second is closed and conversely when a negative or zero input signal is applied the second gate 13 is opened and the first gate 13 is closed. Thus, the phase of the output signal at terminal 14 varies by 180° in accordance with the input binary random signal derived from the output of the shift register 6.

The shift register 6 is of the type described in a book entitled, "Error-Correcting Codes," by W. Wesley Peterson published by M.I.T. Press and John Wiley and Sons in 1961 at page 121. The shift register 6 includes a certain number of binaries 16, such as flip-flops, having the output of one serving as one of the inputs of the next, as indicated, and with the other set of inputs parallel connected, as indicated. The output of the final binary 16 of the series connected array is connected back as the input of the first binary 16 through the intermediary of a modulo-2 adder 17 which has a second input derived from the output of one of the binaries. A modulo-2 adder 17 is provided at each of the nodal points in the feedback path. This particular shift register 6 required only one modulo-2 adder. Others will require two or more such modulo-2 adders.

The shift register 6 is preferably connected for a maximum length sequence in order to simplify construction of the shift register for a given length sequence, i.e., number of bits before the sequence repeats. The number of binaries 16 required for a maximum length sequence $B=2^n—a1$ where $n$ is the number of binaries and B is the number of bits before a repeat. Assuming 1000 bits were required in the random sequence, then $n=10$ is the nearest integer number that will fulfill this condition. The connection for these 10 binaries is then found by reference to the table at page 254 of the aforementioned book by making entry at degree 10, where the degree corresponds to the number of binaries. The first solution is use which is given in code as 2011 E. The code is broken by reference to page 251 where each digit of the table represents three binary digits as follows:

0 1 0 0 0 0 0 0 0 1 0 0 1

Then, starting from the right-hand side, the "1's" indicate a feedback connection. The binaries are layed out starting from right to left in position between digits of the code:

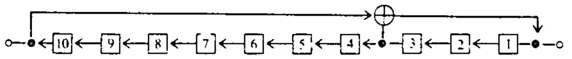

Thus, there is a feedback connection to the input of binary number 1 and there is a feedback connection from the output of binary number 10. There is also a feedback connection to the input of binary number 4. A modulo-2 adder 17 is placed at the intersection of the end connecting feedback path with each intermediary feedback connection. Assuming the binary bits are $10^{13}$ seconds duration $\tau$, then the spectral separation $\Delta f$ is approximately $$\frac{1}{1023}\times 10^{-3}\approx 1Hz.$$

Also the bandwidth B.W. is about $$\frac{2}{\tau}\approx\frac{2}{10^{-3}}\approx 2000\ Hz$$

centered at the carrier frequency $f_o$ or some other desired frequency obtained by heterodyning the carrier with a reference frequency and using either one of the sidebands.

Referring now to FIG. 5 there is shown, in greater detail, a preferred embodiment of the phase modulator circuit 8 of FIG. 4. The phase modulator 8 includes the input transformer 9 with the gates 13 connected between the opposite terminals of the secondary winding and the output terminal 14. The gates 13 each include a pair of series connected diodes 21 and 22. One pair is connected with their anodes back to back and the other pair is connected with their cathodes back to back. The random binary input signal is applied between the diodes 21 and 22 of each pair to ground. Ground is preferably at a potential intermediate the (+) and 0 voltage of the applied binary sequence signal as shown in FIG. 2. A positive input binary signal voltage with respect to ground causes the top pair of diodes 21 and 22 to conduct and the lower pair of diodes 21' and 22' to be nonconductive. Coupling capacitors 23 permit the low frequency or DC binary input signals to be applied to the diodes with respect to ground while permitting radio frequency to be readily coupled therethrough. Radiofrequency chokes 24 permit the low frequency binary currents to flow while isolating the binary input circuit from the radiofrequency circuit. The series connection of diodes, 21 and 22, which form the radiofrequency gate, provide increased isolation over one diode when biased in the nonconducting state. In addition, a third diode 25 is connected between the diodes 21 and 22 to ground to further shunt leakage RF signal to ground when the diodes 21 and 22 are biased for the nonconducting state; thereby further increasing the degree of isolation provided by the gate 13 when biased for the closed condition.

Referring now to FIG. 6 there is shown an alternative binary random sequence generator. In this embodiment, random noise as obtained, for example, from a noise diode, not shown, is sampled with respect to a reference voltage $V_o$ at certain intervals of time. The sampling is done by feeding the noise into a gate 31 and pulsing the gate with a coherent pulse sequence at some suitable frequency as of, for example, 1 to 10 kHz. The output of the gate 31 will then be an output train of pulses at the pulse frequency of the input pulse sequence, except that the output pulses will be positive or negative depending upon the phase of the noise with regard to the reference voltage $V_o$ when sequentially sampled. Also the amplitude of the output pulses will vary. This amplitude variation is undesired and therefore the pulses are fed into an amplifier and limiter 32 the output of which is a train of equal amplitude pulses with positive or negative sign and which pulse train forms a random sequence of infinite length. The pulses are then fed into a pair of parallel connected diodes 33 and 34. Diode 33 is biased to pass only positive sign pulses and diode 34 is biased to pass only negative pulses. The positive pulses are applied to one input of a binary 35 and the negative pulses are inverted by inverter 30 and applied to the other input of the binary 35. The output of the binary 35 is a completely random binary sequence of infinite length which is fed to the modulator 3 of the noise generator 1.

Alternatively, the binary random pulse generator 4 may comprise a recording which has recorded thereon a suitably long binary random sequence. The recording is then played and the output fed to the modulator 3. The recording may take the form of an endless tape which is played repetitively.

Referring now to FIG. 7 there is shown a gyromagnetic resonance spectrometer employing features of the present invention for spin-spin decoupling one species of gyromagnetic resonance bodies from another species of gyromagnetic resonance bodies to simplify the resonance spectrum of the group under analysis. More particularly, a sample of matter under investigation is disposed in a probe 41 and immersed in a DC polarizing magnetic field $H_0$, as of 14,000 gauss. A radiofrequency transmitter 42 applies an alternating magnetic field $H_1$ to the sample at right angles to the polarizing magnetic field.

The polarizing magnetic field is modulated at a convenient frequency, as of 2 kHz. by a signal derived from a field modulator 43 and applied to a coil 44 to superimpose upon the DC field $H_o$ a field modulation component $H_m$. The transmitter frequency $f_1$ and the field modulation frequency $f_m$ are selected to provide a sideband component $f_1 \pm_{fm}$ at the resonant frequency of the species of gyromagnetic bodies, i.e., nuclei to be observed in the sample.

The applied sideband signal excites resonance of the nuclei. The resonating nuclei induce a resonance signal which is picked up by conventional circuits in the probe 41 and fed to an RF receiver 45 wherein the resonance signal is amplified. The output of the receiver 45 is fed to one input of a mixer 46 wherein it is mixed with a sample of the transmitter signal at $f_1$ to produce a frequency resonance signal at the field modulation frequency $f_m$.

The low frequency resonance signal is then fed to a phase sensitive detector 47 wherein it is phase detected against the field modulation signal as a reference to produce a DC resonance output signal which is fed to recorder 48. The DC field $H_0$ is scanned through resonance by a superimposed scan field $H_0$ generated by current passing through a scan coil 49 as derived from a field scan current source 51. A sample of the field scan signal is fed to the recorder 48 for recording the resonance signal as a function of the field scan to obtain an output resonance spectrum of the gyromagnetic resonance species under analysis.

A typical gyromagnetic resonance spectrum is shown in spectrum A of FIG. 8 for the $^{19}F$ nuclei of 1,1,2-Trifluoro-2-chloro-3-vinylcyclobutane. This fluorine spectrum has a frequency range of 2100 Hz. centered at 56.4 MHz. The H nuclei (proton) spectrum, not shown, for the same sample extends over 250 Hz. at 60 MHz. As can be seen from the fluorine spectrum there is a considerable amount of line splitting making it difficult to interpret the spectrum.

The application of noise power to the sample by, for example, the same transmitter coil used for $f_1$ and as obtained from a noise generator 1 and power amplifier 52 previously described in FIG. 1, produces an output resonance fluorine spectrum as shown in spectrum B of FIG. 8. The noise power for this example has a bandwidth of 2000 Hz. and is centered on the center of the proton spectrum having a center frequency of 60.0 MHz. The noise power was less than 4 watts at the input to the transmitter coils. The resultant spectrum B shows the noise decoupled fluorine spectrum with all line splittings due to proton-fluorine couplings removed. The decoupled spectrum demonstrates that the sample consists of a mixture of two isomers. They are obtained by exchanging the fluorine and chlorine in position 2. Further information about the substance under analysis is obtainable by observing the proton resonance while irradiating the fluorine spectrum with noise power. Thus, it is seen that decoupling by means of random noise or by means of a repetitive pseudorandom sequence is a valuable tool to simplify complicated high resolution gyromagnetic resonance spectra. This technique allows the simultaneous elimination of all line splittings caused by heteronuclear (different nuclear species) couplings to one or several nuclear species.

One distinct advantage to the use of noise decoupling in gyromagnetic resonance spectra is the lower power levels required for a given amount of decoupling. This is shown in FIG. 9 where the relative amplitude of the applied decoupling RF magnetic field to the spectrum width of the spectrum to be irradiated is plotted as a function of relative line splitting, where relative line splitting is the ratio of the line splitting to be decoupled to the spectrum width of the species to be decoupled. The RF magnetic field amplitude is expressed in frequency through the relation $$f=\frac{\gamma H_2}{2\pi}$$

where $\gamma$ is the gyromagnetic ratio for the irradiated nuclei, and $H_2$ is the magnetic field intensity of the applied irradiating signal. Curves are shown for double resonance spin-spin decoupling, using only a single decoupling line using a modulated single decoupling line, and using the binary random noise decoupling of the present invention. Groups of curves are shown for various amounts of decoupling where the numerals 10, 20, 50, and 100 represent the ratio of the original line splitting to the residual line splitting or broadening.

From FIG. 9 it is seen that for small relative splittings, i.e., less than 0.2 that the relative amplitude of the applied RF field for noise decoupling is lower for the same amount of decoupling. The power applied goes as the square of the applied field strength and therefore even greater differences in applied power are evident. For example, using the modulated double resonance method to remove a 0.01 relative line splitting by a factor of 100 might take 16 watts of applied power, whereas the same result is obtained with the noise decoupling method using only 0.64 watts. This is especially important when it is realized that conventional probe designs are capable of handling only about 4 watts of RF power without burning through. These power handling limitations can be overcome by rebuilding and redesigning the probes, but this is a relatively costly solution.

Although the noise generator of the present invention has been described in detail as used in combination with a gyromagnetic resonance spectrometer for spin decoupling different species of the sample, it is also useful for exciting resonance of different ion species in an RF mass spectrometer. In this case the mass of ions is detected by the absorption of radio frequency energy from an applied RF electric field at resonance of the ions in a magnetic field. It turns out that valuable information about chemical interactions between the ions under analysis and other ions can be obtained by exciting resonance of other ion species of the sample and observing the changes in the resonance of the ion specie under observation. The noise generator 1 of the present invention is useful for exciting resonance of these other ion species of the sample. Such a double resonance mass spectrometer is described and claimed in copending U.S. Pat. application Ser No. 566,973 filed July 21, 1966. The noise generator 1 of the present invention is also useful for exciting gyromagnetic resonance of a spectrum of a sample in a spectrometer of the type described and claimed in U.S. Pat. application Ser. No. 301,225 filed July 15 1963 now U.S. Pat. No. 3,287,629, and assigned to the same assignee as the present invention.

Since many changes could be made in the above construction and many apparently widely different embodiments of this invention could be made without departing from the scope thereof, it is intended that all matter contained in the above description or shown in the accompanying drawings shall be interpreted as illustrative and no in a limiting sense.

I claim:

1. In a radiofrequency spectrometer for observing resonance of matter in a magnetic field, means for applying a noise signal covering a band of frequencies centered at a first frequency to a sample under analysis to excite resonance of the sample, means for detecting resonance of the sample, said means for applying the noise signal to the sample including means for generating a radiofrequency carrier signal, means for producing a binary random sequence signal, and means for modulating the phase of the radiofrequency carrier signal with the binary random sequence signal for modulating the phase of the carrier signal by plus or minus 180° relative phase according to the binary random sequence to produce a noise output signal, whereby a broadband high spectrol density noise output signal of essentially constant power is obtained with a well defined continuous function power spectrum.

2. The apparatus of claim 1 wherein the radiofrequency spectrometer is a nuclear magnetic resonance spectrometer.

3. The apparatus of claim 1 wherein the spectrometer also includes, means for applying radiofrequency wave energy at a second frequency to the sample under analysis to excite resonance of a first species of the sample, and wherein the applied noise signal excites resonance of a second species of the sample, and wherein said resonance detecting means detects resonance of the first species as affected by the excited resonance of the second species.

4. The apparatus of claim 3 wherein said means for modulating the radiofrequency carrier with the binary random sequence to produce the noise output signal includes a phase modulator for modulating the phase of the carrier signal between conditions of plus and minus 180° relative phase at the binary random sequence, whereby the power of the noise output signal may be held essentially constant with time.

5. The apparatus of claim 3 wherein the spectrometer is a nuclear magnetic resonance spectrometer and the applied noise signal serves to spin decouple the resonance of one nuclear species from resonance of a different nuclear species under observation.

6. The apparatus of claim 1 wherein said means for producing the binary random sequence signal produces a random sequence of at least 250 bits per second, whereby the frequency separation of the spectral lines of the noise power are sufficiently close together over a bandwidth of 1 kilohertz.

7. The apparatus of claim 6 wherein said means for producing the binary random sequence signal includes a shift register having an array of at least eight binary units, and having an electrical feedback loop containing at least one modulo-2 adder interconnecting the ends of said binary array, and said shift register being connected for maximum length sequences.

8. The apparatus of claim 6 wherein said means for producing the binary random sequence signal includes, a noise source, means for sampling the noise signal output of said noise source to derive a train of pulses having signs in accordance with the sign of the noise as sampled by said sampling means, and means forming a binary responsive to the train of pulses for producing the binary random sequence output signal.

9. In a radiofrequency spectrometer for observing resonance of matter in a magnetic field, means for applying a noise output signal covering a band of frequencies centered at a first frequency to a sample under analysis to excite resonance of the sample, means for detecting resonance of the sample, said means for applying the noise output signal to the sample including, means for generating a radiofrequency carrier signal, means for producing a digital random sequence signal and means for modulating the phase of the radiofrequency carrier signal with the digital random sequence signal for modulating the phase of the carrier signal by predetermined degrees of relative phase shift according to the digital random sequence to produce a noise output signal, whereby a broadband high spectral density noise output signal of essentially constant power with a well defined continuous function power spectrum is obtained for exciting resonance.